US006182440B1

(12) United States Patent
Bilenas et al.

(10) Patent No.: US 6,182,440 B1
(45) Date of Patent: Feb. 6, 2001

(54) INFRARED RADIATION COANDA SUPPRESSOR

(75) Inventors: Jonas Bilenas, Dix Hills; Robert Kosson, Massapequa; Salvatore Attard, Huntington, all of NY (US)

(73) Assignee: Northrop Grumman Corporation, Los Angeles, CA (US)

( * ) Notice: Under 35 U.S.C. 154(b), the term of this patent shall be extended for 0 days.

(21) Appl. No.: 06/818,645

(22) Filed: Jan. 14, 1986

(51) Int. Cl.[7] .................................................. F02C 7/00
(52) U.S. Cl. ..................... 60/39.5; 60/265; 239/127.1; 239/265.17; 239/DIG. 7
(58) Field of Search .............. 239/127.1, 127.3, 239/265.17, 265.19, DIG. 7; 244/12.5, 23 D; 60/39.5, 264, 265

(56) References Cited

U.S. PATENT DOCUMENTS

| | | | |
|---|---|---|---|
| 2,702,986 | 3/1955 | Kadosch et al. ...................... 60/35.54 |
| 2,825,204 | 3/1958 | Kadosch et al. ...................... 60/35.6 |
| 3,047,208 | 7/1962 | Coanda ................................. 230/95 |
| 3,062,483 | 11/1962 | Davidson ............................. 244/42 |
| 3,066,894 | 12/1962 | Davidson ............................. 244/76 |
| 3,091,924 | 6/1963 | Wilder, Jr. ......................... 60/35.54 |
| 3,685,614 | 8/1972 | Coanda et al. ...................... 181/33 E |
| 3,806,039 | 4/1974 | Mocarski ........................... 239/417.3 |
| 3,921,906 | * 11/1975 | Nye et al. .......................... 239/127.3 |
| 3,981,448 | 9/1976 | Demogenes et al. ............. 239/127.3 |
| 3,982,696 | 9/1976 | Gordon .............................. 239/265.17 |
| 4,007,587 | * 2/1977 | Banthin et al. ................ 239/127.3 X |
| 4,018,046 | 4/1977 | Hurley .................................... 60/264 |
| 4,044,555 | 8/1977 | McLoughlin et al. ................. 60/264 |
| 4,205,813 | * 6/1980 | Evans et al. ........................ 244/12.5 |
| 4,215,537 | * 8/1980 | Hurley .................................... 60/264 |
| 4,266,722 | 5/1981 | Nawa et al. ...................... 239/590.5 |
| 4,336,017 | 6/1982 | Desty ................................... 431/202 |
| 4,413,668 | 11/1983 | Allard ...................................... 165/1 |
| 4,448,354 | 5/1984 | Reznick et al. ................. 239/265.17 |

* cited by examiner

*Primary Examiner*—Harold J. Tudor
(74) *Attorney, Agent, or Firm*—Terry J. Anderson; Karl J. Hoch, Jr.

(57) ABSTRACT

An infrared radiation Coanda suppressor of an exhaust system encloses a Coanda surface for guiding exhaust gases into the atmosphere. The infrared radiation suppressor further uses cooling films for reducing the temperature of the Coanda surface and other exposed surfaces. A cool air entrainment flow of the exhaust gases prevents the buildup of recirculating hot gases in the exhaust chamber. As a result, IR radiation is suppressed from areas of the exhaust system which are exposed to IR detectors.

4 Claims, 1 Drawing Sheet

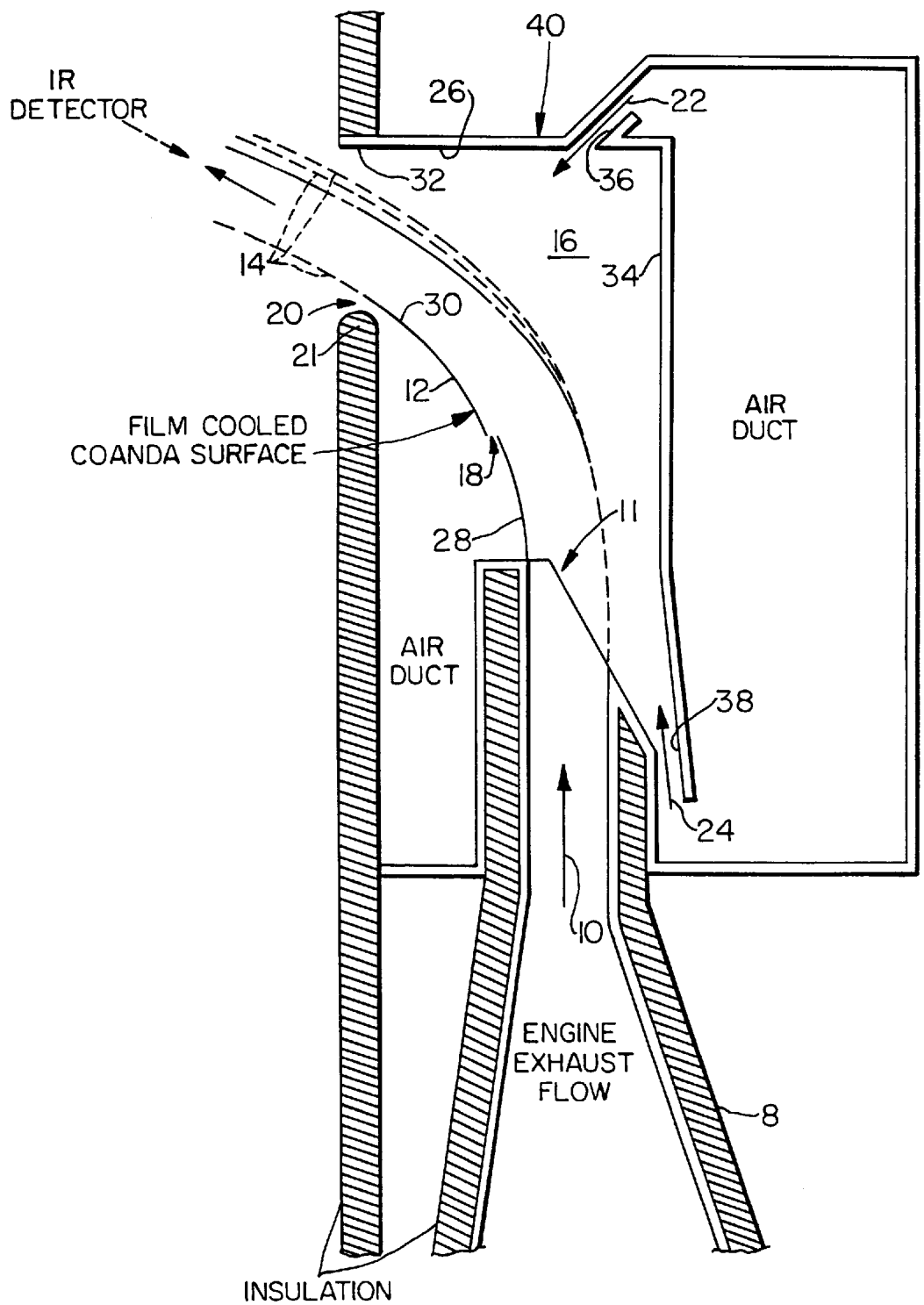

INFRARED RADIATION COANDA SUPPRESSOR

FIELD OF THE INVENTION

The present invention relates to infrared radiation suppressors and more particularly to an infrared radiation suppressor which utilizes a Coanda surface and film cooling concepts.

BACKGROUND OF THE INVENTION

Infrared radiation homing missiles have been developed for tracking down aircraft or vehicles which utilize either gas turbines or other engines, as metal parts which are exposed to hot exhaust gases from the engines would tend to radiate infrared radiation. Thus, it becomes necessary, in order to decrease the vulnerability of aircraft, vehicles or other engine-driven equipment which have hot gas exhaust systems, to suppress the visible and infrared radiation.

One conventional method of suppressing the detection of infrared radiation is to have an elbow connected to the exhaust such that all parts which are exposed to the hot exhaust gases would be hidden from the view of an infrared radiation detector. However, arising with the use of the elbow are problems of hot exhaust gases recirculating within the cavity of the elbow, thereby aspirating atmospheric air into the cavity, and the inside concave surface of the same elbow being impinged directly by hot exhaust gases. As a consequence, this hot surface would emit infrared radiation, thereby defeating the purpose of the elbow. Also, the same surface would be overheated as it is very difficult to cool this upper surface—witnessed by the use of multilayered ducts to channel hot air away from the engine generator set—disclosed by Allard in U.S. Pat. No. 4,413,668.

BRIEF DESCRIPTION OF THE PRESENT INVENTION

The present invention eliminates the aforesaid problems by allowing a smooth evacuation of hot exhaust gases and the simultaneous cooling of the upper surface of the exhaust chamber by utilizing the Coanda surface effect in conjunction with film cooling technology. To prevent gas impingement on the upper surface of the exhaust chamber, a curved plate based on the Coanda effect is used for guiding hot exhaust gases out of the exhaust chamber. To keep the curved plate cool and to prevent hot exhaust gases from recirculating within the exhaust chamber, film cooling technology is used to cool the Coanda plate and the exhaust chamber and to entrain the hot exhaust gases therefrom.

When utilizing the present invention, the following objectives can be achieved:

1) the avoidance of a direct line of sight of an IR detector into the actual source of infrared emission;

2) the elimination of immediate heat impingement on the upper surface of the exhaust chamber;

3) the improved suppression of infrared radiation from the hot exhaust system.

BRIEF DESCRIPTION OF THE FIGURE

The above-mentioned objects and advantages of the present invention will be readily understood when considered in conjunction with the accompanying drawing, in which:

The FIGURE is a schematic diagram of the present invention which utilizes both the Coanda effect and film cooling technology.

DETAILED DESCRIPTION OF THE INVENTION

Referring now to the FIGURE, instead of showing a tubular exhaust, there is shown a rectangular engine exhaust 8 for molding the exhaust gas flow 10 in the form of a thin sheet 11, for example, of approximately 18 inches wide and one inch thick. It should be noted that the measurement of the exhaust gas flow is strictly used for illustration purposes only and the dimension of the thin sheet is not meant to be limiting. Flow 10 is discharged adjacent to a two-dimensional convex film cooled surface 12. The convex film cooled surface 12 is the so-called Coanda surface, based on the Coanda effect, described in U.S. Pat. No. 2,052,869 issued to Henri Coanda on Sep. 1, 1936. In principle, the Coanda effect is the tendency of a gas or liquid coming out of the jet to travel close to the wall contour even if the direction of curvature of the wall is away from the axis of the jet. Coanda surface 12 does not have to be made of any particular material.

As shown, the Coanda surface is made up of two sections. At the juncture of the two sections is cooling slot 18. It should be noted that it is not mandatory to divide a Coanda surface into two sections. As shown in the FIGURE, it is clear that the lower section is separated from the upper section at a point where the line of sight of an IR detector cannot reach the second Coanda section. Cooling slot 20 is located between the underside of Coanda surface 12 and the outside insulation 21 of the exhaust system. The exhaust chamber further has cavity 16 and, looking only at the cut-away portion of the exhaust chamber, inside walls 26 and 34. Coolant air 22 and 24 are injected into cavity 16 via cooling inlets 36 and 38, respectively.

In operation, an enclosure 40 is placed over the engine exhaust 8. This allows engine exhaust gas flow 10 to flow in an upward direction into cavity 16. This hides the engine exhaust from the direct line of sight of any infrared radiation detector. However, by so doing, the inside areas of enclosure 40 are heated up by the hot exhaust gases. Further, although an opening 32 is provided, turbulence is created in cavity 16 because exhaust flow is not expediently removed from the enclosure.

To obviate this problem, curvilinear Coanda surface 12 is placed to engage engine exhaust 8 such that gas flow 10, after being molded by engine exhaust 8 into a thin rectangular sheet 11, is guided along curvilinear Coanda surface 12, via the Coanda effect, into the atmosphere through opening 32. As can be seen, Coanda surface 12 consists of two sections, the cooling slot 18 interposed therebetween. By positioning Coanda surface 12 in such a fashion, gas flow 10, which is in the form of a rectangular sheet, is guided along the Coanda surface and exits into the atmosphere without creating the type of turbulence which would have existed in cavity 16 were it not for the Coanda surface.

To prevent heat build-up, cool air is injected on Coanda surface 12 through cooling slot 18. The cool air thus injected forms a cooling film over Coanda surface 12, separating the same from the hot exhaust gases. Cool air is also injected at the end section of Coanda surface 12 through slot 20 for further cooling the exhaust gases. Experiments have shown that the injected cool air, instead of adding additional turbulence in cavity 16, actually forms a layer for protecting Coanda surface 12 from hot exhaust gases. The lower section of Coanda surface 12 is not protected by the cool air film as it is unnecessary to do so, primarily because irrespective of how much infrared radiation it emits, it is not in a direct line of sight of any infrared radiation detector.

Some mixing occurs between the outer layers of the exhaust gas and the air in cavity 16, so that some of the air in cavity 16 is entrained by the sheet 11 and ejected to atmosphere. This aspiration effect acts to reduce the pressure in cavity 16 and must be countered to prevent a suction effect on sheet 11 which would pull it away from Coanda surface 12. The present invention accomplishes this by supplying coolant air 22 and 24 to cavity 16 through cooling inlets 36 and 38, respectively. The functions of coolant air 22 and 24 are twofold. First, by introducing coolant air from cooling inlets 36 and 38, a positive pressure is introduced into cavity 16 for getting rid of entrapped exhaust gases therein. Second, because wall 34 can become visible to infrared radiation detectors, coolant air 24 injected on wall 34 through coolant inlet 38, similar to the cooling of Coanda surface 12, forms a cooling film on wall 34, separating any hot exhaust gases therefrom. Likewise, coolant air 22 from coolant inlet 36 provides a layer of cool air separating wall 26 from the hot exhaust gases.

Thus, by providing a Coanda surface and utilizing the film cooling technology to cool the same surface and the other surfaces which enclose an engine exhaust, the emission of infrared radiation is suppressed. As the Coanda effect is well known, the design of such a surface should also be well known to one who is skilled in the art. However, in the interest of further illuminating the present invention, a specific design of the embodiment, discussed hereinabove, is given hereinbelow.

For low nozzle discharge pressure ratio (stagnation to static pressure ratio less than 1.2), 45° turning of the exhaust gases by the Coanda surface is possible with an aspect ratio of 18 and a surface radius of curvature equal to four times the jet thickness. For a one inch thick jet, the radius of curvature is then 4 inches and the visible flow length for a 45° turn is 3.14 inches.

Using a specific diesel engine for illustration purposes with the 18 inches by one inch exit area gives a discharge velocity of a little more than 100 feet per second and a discharge pressure dynamic head of about 0.9 inch $H_2O$. Coanda surface 12 must be film-cooled, and the design of the film cooling system is defined by the relationship:

$$\eta_{fc} = \frac{1.9 Pr^{2/3}}{1 + 0.329 \frac{C_{pg}}{C_{pc}} \xi^{0.8}} \quad (1)$$

where

Pr is a mean Prandtl number (average of $Pr_g$ and $Pr_c$), $C_{pg}$ and $C_{pc}$ are the specific heats of the gas and coolant, and $\xi$ is a dimensionless length parameter defined by $$\xi = \frac{\left(\frac{L_f}{ms}\right)\left(\frac{x}{L_f}\right)\psi}{\left(Re_s \frac{\mu_c}{\mu_g}\right)^{1/4}} \quad (2)$$

In this expression, $L_f$ is the film cooling length, s is the coolant slot height, m is the blowing parameter defined by $$m = \frac{(\rho V)_c}{(\rho V)_g} \quad (3)$$

$Re_s$ is the slot Reynolds Number, based on the coolant properties and slot height, $\mu_c$ and $\mu_g$ are dynamic viscosities of the coolant and gas streams, and $\psi$ is an empirical stretching factor to introduce some conservatism in the calculation. $\psi=1.5$ is used for this example to allow for exhaust gas turbulence, flow non-uniformities, variations in slot dimensions, and other real world phenomena which can degrade ideal film cooling effectiveness.

For this example where the required wall temperature and coolant temperature are small compared with gas temperature, a film cooling effectiveness value of one is used. Equation (1) can then be recast in the form $$\xi^{0.8} = \frac{[1.9 Pr^{2/3} - 1]}{0.329 (C_{pg}/C_{pc})} \quad (4)$$

for Pr=0.712, $C_{pg}$=0.262 and $C_{pc}$=0.24 BTU/(lb$_m$° F.), equation (4) then gives a dimensionless length parameter $\xi$=1.57.

If coolant air is supplied at the same dynamic head as the gas stream (0.9 inch $H_2O$), equation (3) gives a blowing parameter m=2.21. Equation (2) can be rearranged in terms of slot height to the form $$S^{5/4} = \frac{x\psi}{m\xi\left(\frac{\rho_c V_c}{\mu_g}\right)^{1/4}} \quad (5)$$

which (for x=3.14 inch, $P_c$=0.0716 lbm/ft$^3$, $V_c$=96.4 ft/sec, and $\mu_g$=0.208×10$^{-4}$ lbm/ft-sec) yields a slot height of S=0.165 inch. Note that a similar film cooling slot must be supplied on the sidewalls bounding the discharge jet. Allowing two inches for each sidewall, the total slot width w being 22 inches, the total slot flow is $Q_{fc}=S \times W \times V_c=146$ cfm In addition to the film cooling flow, additional coolant to balance the entrainment which occurs at the surface 12 must be supplied. Otherwise the exhaust jet will aspirate the cavity, partially detach from the Coanda surface, and fill the cavity with recirculating hot gas flow. The free surface of the jet is almost 7 inches long, which is twice the length of the Coanda surface 12.

An estimate of the entrainment rate can be made using fully developed free turbulent boundary layer mixing theory. For simplicity, assuming isoenergetic mixing, the following equation can be written $$Q_{ent} = \frac{wxu_g}{2\sigma} \int_{\alpha_s}^{\alpha_j} (1 + \text{erf}\alpha) d\alpha \quad (6)$$

where w and x are the width and length of the entrainment surface (18 and 6.75 inches, respectively), $u_g$ is the gas velocity (96 fps), is a dimensionless length normal to the flow direction, defined by $$\alpha = \sigma \frac{y}{v} \quad (7)$$

and 6 is a dimensionless turbulent mixing parameter empirically determined to have a value of 12 for incompressible flow. The coordinate distance y in equation (7) is defined as positive proceeding from the free jet boundary into the discharge jet.

The limits of integration in equation (6) are taken from a location at the outer edge of the mixing layer where the temperature is 10° C. above ambient, $_s$=1.42, to the dividing jet boundary streamline within the mixing layer for zero net mass transfer, $_j$=0.209. With these limits, equation (6) gives $Q_{ent}$=169 cfm. This should be a conservative estimate. A more accurate calculation, allowing for density gradients across the mixing layer, would probably show only ⅔ of this value.

Note that while this flow is supplied essentially at atmospheric pressure, it must be provided by a blower if the air is to be drawn from within the case, since the case internal pressure is about 1 to 1½ inches H$_2$O below atmospheric pressure.

From the foregoing discussion it should be clear that the present invention provides an infrared suppressor which utilizes a Coanda surface to eliminate the need for an elbow, film cooling from cooling slots for reducing the temperature of the Coanda surface and entrainment coolant air flows for preventing the buildup of recirculating hot gases in the exhaust cavity and the cooling of the walls of same.

While a preferred embodiment of the invention is disclosed herein for purposes of explanation, numerous changes, modifications, variations, substitutions and equivalents, in whole or in part, will now be apparent to those skilled in the art to which the invention pertains. Accordingly, it is intended that the invention be limited only by the spirit and scope of the appended claims.

We claim:

1. Apparatus utilizing the Coanda effect for suppressing the emission of infrared radiation from surfaces affected by hot exhaust gases of an engine, comprising:

an enclosure having an opening to atmosphere;

exhaust means projecting into the enclosure but away from the opening and outside the line of sight thereof for molding the hot exhaust gases from the engine into a fluid sheet;

a Coanda surface extending from the molding exhaust means for directing the fluid sheet curvilinearly into the atmosphere through the opening of the enclosure; and a first inlet aligned with the Coanda surface for injecting cool air onto the Coanda surface, in the direction of the exhaust gases for forming a first laminar cooling film between the exhaust gas fluid sheet and the surface.

2. The structure set forth in claim 1, together with at least a second inlet located on inside enclosure walls opposite to the Coanda surface for injecting cool air into the enclosure, the cool air keeping the enclosure and the walls thereof from emitting infrared radiation by forming cool air layers along the walls and by providing a positive entrainment flow for evacuating the hot exhaust gases through the enclosure opening.

3. Method of suppressing infrared radiation emitted from an exhaust outlet heated by hot exhaust gases of an engine, comprising:

enveloping the exhaust outlet of the engine in an enclosure having an opening to atmosphere;

molding the hot gases from the exhaust outlet into a fluid sheet;

guiding the fluid sheet along a Coanda surface curvilinearly through the opening of the enclosure to the atmosphere; and injecting, alongside the surface of the Coanda surface, a first laminar film of cooling air between the Coanda surface and the fluid sheet.

4. The method set forth in claim 3, together with the step of further injecting cool air into the enclosure from sides of the enclosure facing the Coanda surface for forming cool air layers along the inside walls of the enclosure and for providing an entrainment flow for evacuating the hot exhaust gases in the enclosure to atmosphere.

\* \* \* \* \*